United States Patent [19]

Bouthors

[11] 3,840,277

[45] Oct. 8, 1974

[54] ANTI-SKID BRAKE SYSTEM

[75] Inventor: Pierre Marcel Bouthors, Croissy-sur-Seine, France

[73] Assignees: Regie Nationale Des Usines Renault, Billancourt; Automobiles Peugeot, Paris, both of, France

[22] Filed: June 13, 1973

[21] Appl. No.: 369,476

[30] Foreign Application Priority Data

July 19, 1972 France .............................. 72.26082

[52] U.S. Cl. ............... 303/21 P, 235/150.2, 303/20
[51] Int. Cl. ............................................. B60t 8/08
[58] Field of Search ...... 188/181 C; 235/150.2, 177; 303/20, 21; 317/5; 324/161; 340/53, 263, 146.2

[56] References Cited
UNITED STATES PATENTS

| | | | |
|---|---|---|---|
| 3,608,978 | 9/1971 | Neisch ........................ | 303/21 EB |
| 3,620,577 | 11/1971 | Neisch et al. .................... | 303/21 EB |
| 3,653,727 | 4/1972 | Kullberg et al. ................... | 303/21 P |
| 3,735,200 | 5/1973 | Kritz ........................... | 303/21 BE X |
| 3,740,103 | 6/1973 | Sweet et al. .................... | 303/21 EB |
| 3,744,854 | 7/1973 | Ooya et al. ..................... | 303/21 P |

Primary Examiner—Trygve M. Blix
Assistant Examiner—Stephen G. Kunin
Attorney, Agent, or Firm—Strauch, Nolan, Neale, Nies & Kurz

[57] ABSTRACT

Anti-skid braking system in which braking of the rear wheels is interrupted as soon as the speed of the faster rear wheel has dropped to a predetermined fraction $V_1$ of the speed $V_0$ which was the speed of this wheel at the beginning of the cycle, then the time $t'_1$ which elapses during the passage of this speed through increasing values between two predetermined intermediate fractional values of the speed $V_0$ which was the speed of the wheel at the beginning of the cycle is counted backwards, whereupon this time is multiplied by a constant factor such that at the end of this time the wheel is never under any circumstances slipping relative to the ground, and then the speed of the faster rear wheel is measured and stored, both for the purpose of checking the braking of the rear wheels during the next cycle and for the purpose of continuous control of the electromagnetic means affecting braking of the front wheels, and the braking of the rear wheels is restablished to begin a new cycle.

3 Claims, 5 Drawing Figures

ANTI-SKID BRAKE SYSTEM

BACKGROUND OF THE INVENTION

The invention relates to a device for detecting locking of the wheels of a motor vehicle and for actuating electromagnetic or electromechanical means acting on the brake circuit.

Under certain poor adhesion conditions the application of a considerable braking force to the wheel of a motor vehicle may cause this wheel to lock so that the braking distance increases and the vehicle cannot be steered.

In known devices the wheel locking information derives from deceleration threshold detectors. However, this information does not take into account the coefficient of adhesion to the road surface.

SUMMARY OF THE INVENTION

An object of the invention is to supply the electromagnetic braking control device with information which enables the slip of each wheel to be maintained substantially at its optimum value. For this purpose a distinction is made between the front and rear wheels of the vehicle.

Actuation of the means for braking the front wheels (separately or both together) is controlled as a function of the slip. Since the vehicle speed information derives from the rear wheels, it is therefore possible to ensure optimum operation of the braking control device in respect of this axle and thereby to ensure that the vehicle remains steerable. The device for controlling braking of the rear wheels (separately or both together) is controlled by an electronic calculator as follows (in respect of one wheel): When the driver operates the brakes of the vehicle, the speed of the wheel is stored. If the wheel locks, the speed of the wheel decreases rapidly. When it reaches a predetermined fraction of $V_0$, corresponding to a slip $g_1$, braking is interrupted by the electromagnetic means and the calculator evaluates the time $t_2$, and the wheel speed and vehicle speed therefore coincide again. This information is transmitted to the front wheels, and braking of the rear wheel is resumed. It will be appreciated that if the cycle frequency is high enough relative to the vehicle speed, the latter is sampled fully enough to supply correct information to the front wheels. The slip of the front wheels relative to the ground is then adjusted to the optimum value, and the rear wheel slip varies between 0 and $g_1$.

The resulting anti-lock device comes very close to providing the optimum solution, yet requires only simple speed sensors well-known in the art.

THE DRAWINGS

The invention will be better understood from the ensuing description and the accompanying drawings, in which.

DESCRIPTION OF PREFERRED EMBODIMENTS

Figure 1:
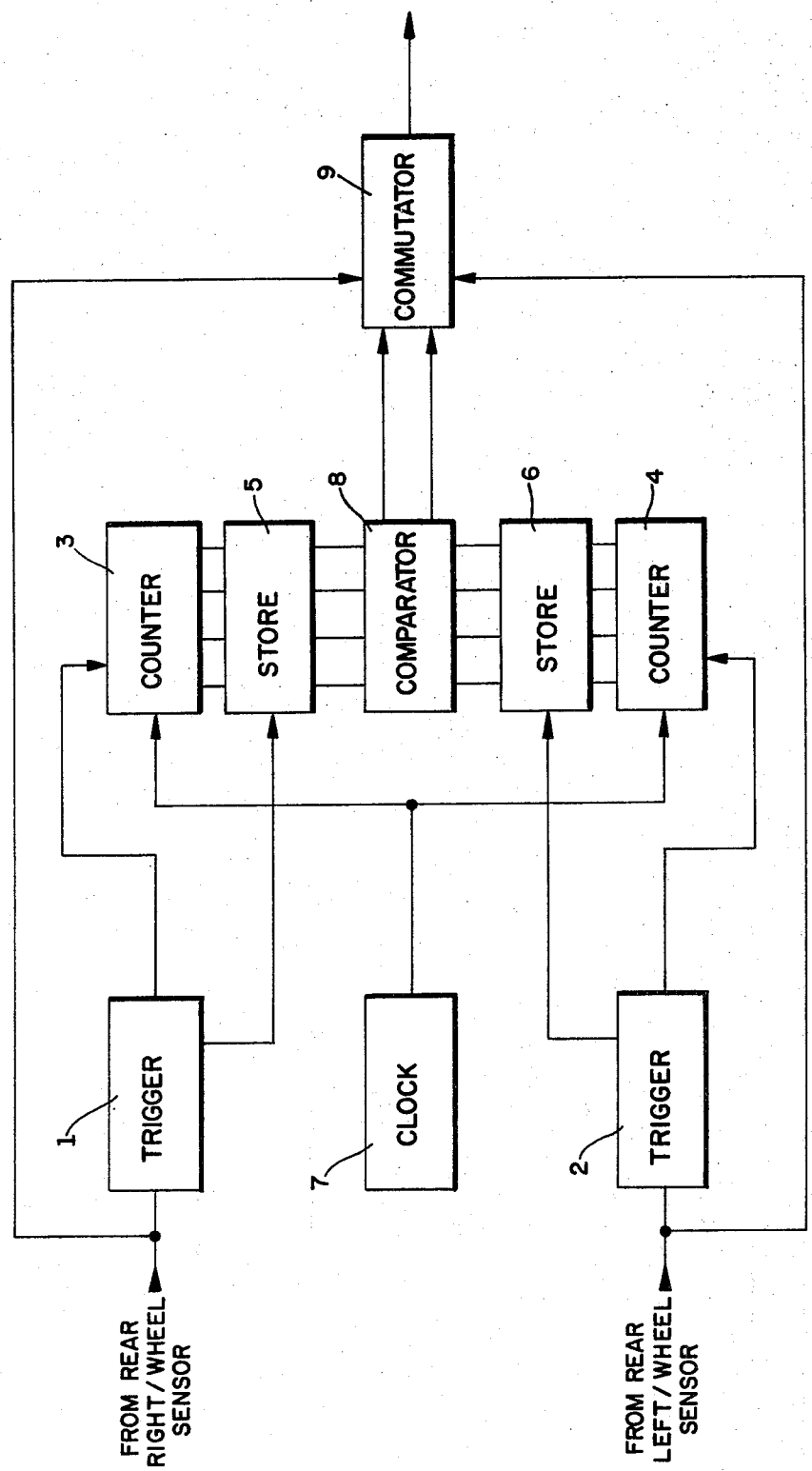
FIG. 1 is a block diagram illustrating electronic circuitry for selecting the faster rear wheel.

FIG. 1 shows an embodiment of an electronic system for selecting the faster rear wheel of a vehicle. The signals obtained from the rear wheels, shaped at 1 and 2, generate zero resetting signals for counters 3, 4 and gating signals for registers 5, 6. A fixed output clock 7 is connected to the inputs of the counters 3, 4. The results of these computations are compared in a comparator 8 which supplies the information discriminating between the rear wheels to a junction 9, the output of which is the signal from the sensor for the faster rear wheel.

Figure 2:
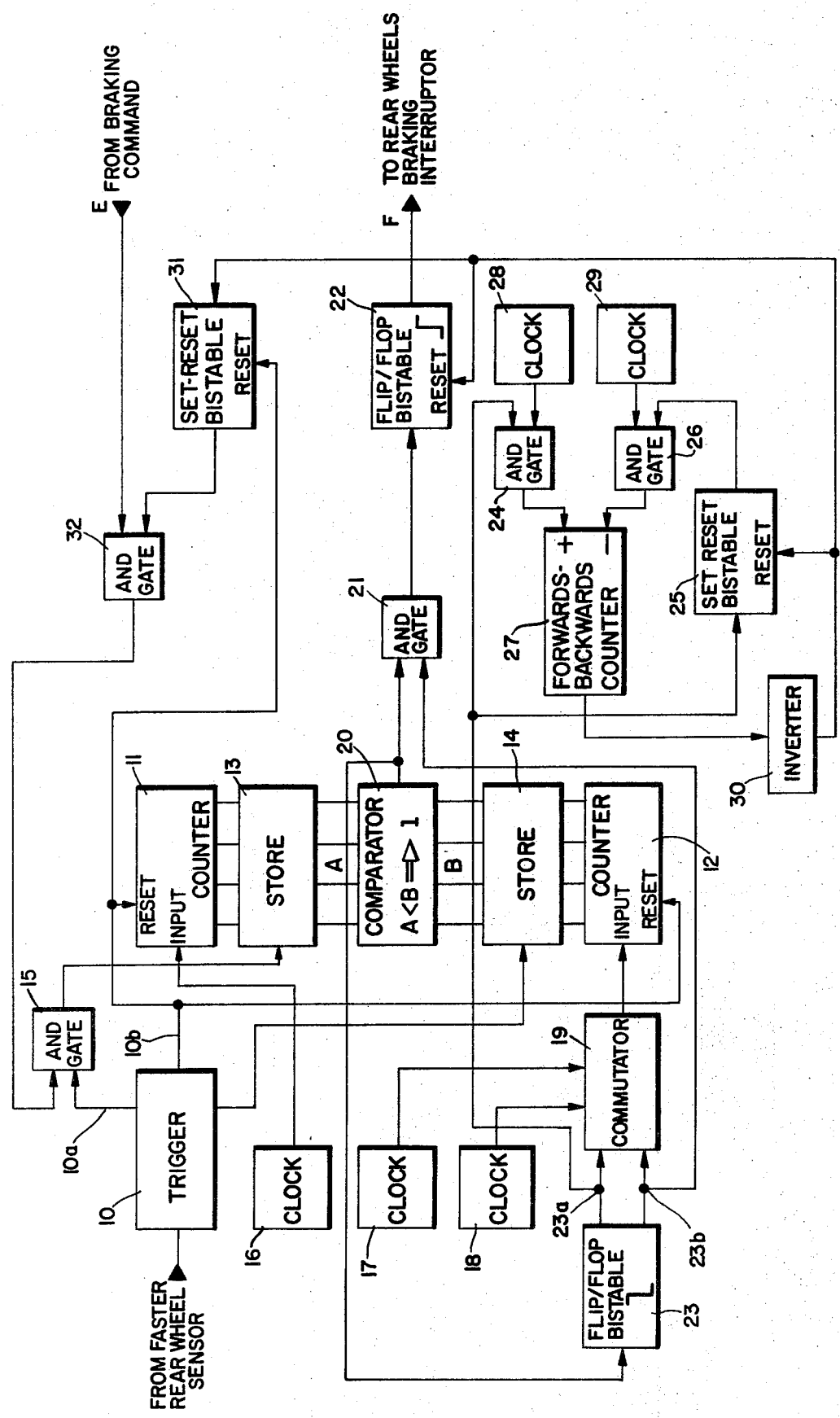
FIG. 2 is a block diagram illustrating electronic circuitry for controlling the braking and release of the rear wheel concerned and for giving the actual vehicle speed in discrete steps.

FIG. 2 shows an embodiment of an electronic device for controlling braking of the faster rear wheel and for sampling the actual speed of the vehicle. The signal from the sensor for the faster rear wheel, shaped at 10, generates zero resetting signals for counters 11, 12 and gating signals for registers 13, 14, the signal for 13 passing through a gate 15. A clock 16 is connected to the input of counter 11. Two other clocks 17, 18 are connected to the input of counter 12 by a junction 19. The frequency ratios between the clock 16 and the clocks 17, 18 determine the thresholds of the device. The information from the counters 11, 12 is compared via the registers 13, 14 in a comparator 20. The comparator output, through gate 21, operates a bistable 22 responsive to leading edges, which determines the time at which braking of the wheel is interrupted, and also the bistable 23 responsive to trailing edges, which operates the junction 19 so as to switch over the clocks 17, 18.

Figure 3:
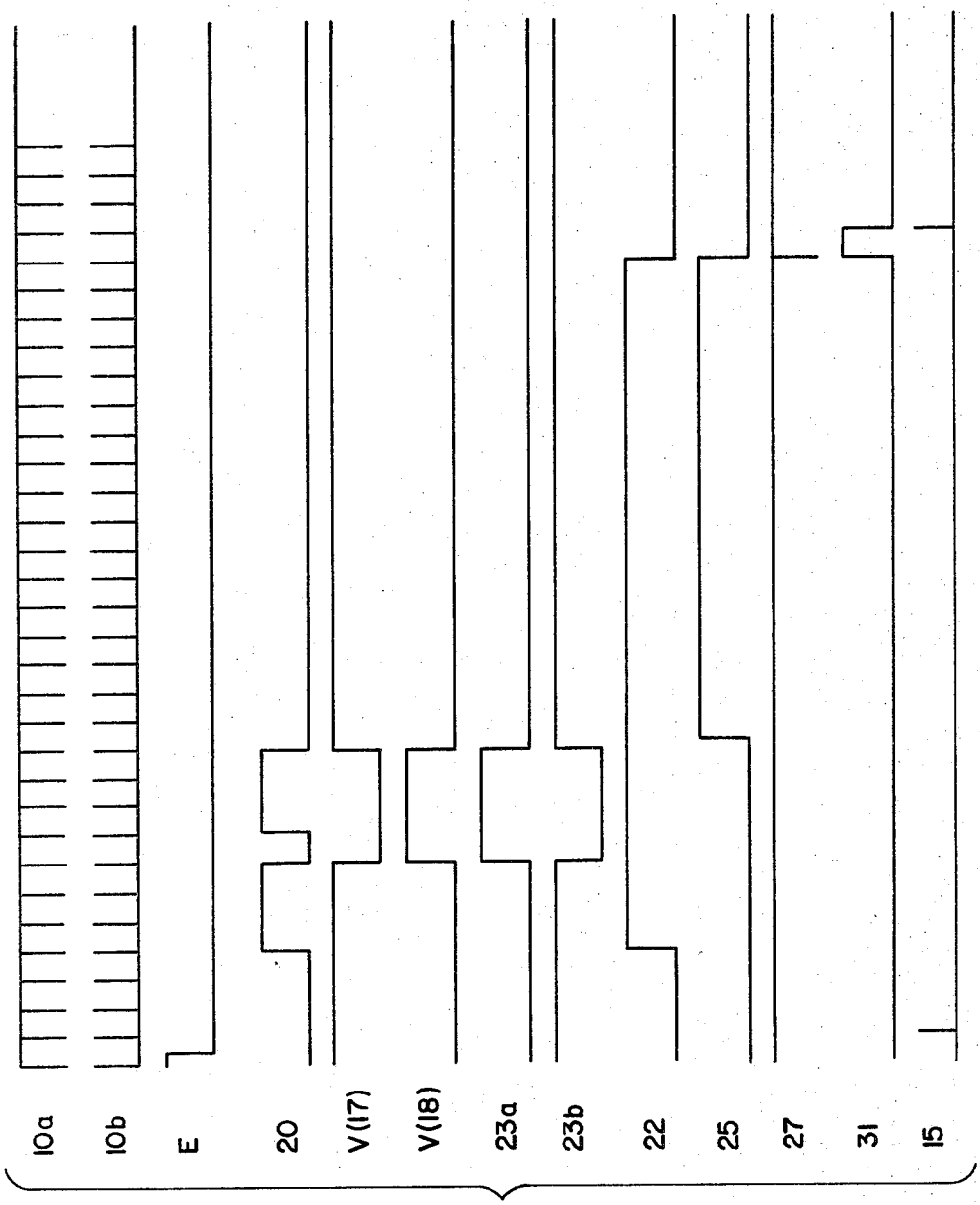
FIG. 3 illustrates the shape of signals obtained at different points in the block diagram in FIG. 2.

The complementary outputs of the bistable 23 also serve to start calculation of the brake-release time by acting on a backwards-and-forwards counter 27 by way of a gate 24 and by way of a bistable 25 and gate 26 respectively. Clocks 28, 29 are connected by the gates 24, 26 respectively, to the forward-and-backward-counting inputs of the backwards-and-forwards counter 27. After back-counting, the output signal from 27 is inverted at 30 and then resets 25 to zero and operates a bistable 31 responsive to trailing edges. The bistable 31 is reset to zero by the zero resetting signal generated by 10. The output from 31 and the signal E to begin braking are fed to a gate 32, which works the gate 15 and permits restarting of the process by gating the information in the register 13. Operation of the device shown in FIG. 2 will be better understood with reference to the signal diagram in FIG. 3.

At the beginning of the cycle the vehicle and the rear wheel selected are at the same speed. This speed V is evaluated by means of the clock 16 in the counter 11, and since E is at the level 1, gating takes place through 13 to the parallel input A of the comparator 20, giving V (16). Furthermore, the same speed V is evaluated by the clock 17 in the counter 12, gating taking place through 14 to give V (17) at the parallel input B of the comparator 20, the clock 16 having a higher frequency than 17, A is greater than B and the output from 20 is at the level 0. Braking by means of the pedal causes E to change from 1 to 0 and therefore 15 operates to prevent gating to register 13. The speed at the input A of 20 is then set at $V_0$ (16), and it is compared at each period of the signal from the rear wheel sensor to V (17) in 20. When the wheel has decelerated enough, A becomes equal to or less than B, and the bistable 22 responsive to a leading edge changes over and interrupts braking of the rear wheel concerned. Due to the system lag, however, the wheel continues to slow down for a moment before picking up speed. When it passes the threshold again, the output from comparator 20 drops back to 0 and by the action of the bistable 23 responsive to a trailing edge changes over and permits, firstly, switching of the clocks 17 and 18 by way of the junction 19, with the result that at the next period A < B (clock 18 having a slightly higher frequency than clock 17), and, secondly, counting in the backwards-and-forwards counter 27 of the pulses from the clock 28.

As the wheel picks up speed again, the threshold A > B is reached, the output from 20 drops back to 0, so restoring V (19) and V (17) to their previous state in preparation for the next cycle and also closing 24 and changing over 25, which opens 26 and admits pulses from the clock 29 to the back-counting input of 27. The ratio between the frequencies of the clocks 28, 29 determine the multiplying coefficient C of the time $t'_1$. When the backwards-and-forwards counter 27 reaches zero a pulse to finish back-counting is generated. After inversion this pulse will reset to 0 bistable 25, so that by way of gate 26 pulses from clock 29 are prevented from reaching the back-counting input of 27, and 22, so restoring braking of the wheel, and it will also change over the bistable 31 which then, by way of the gates 32 and 15, permits the passage of a gating pulse for the register 13. The wheel speed, which is now equal to the vehicle speed, now appears at the input A of comparator 20 and provides the new reference value for another cycle. The bistable 31 is reset to 0 immediately after this gating by the zero resetting signal generated by 10.

This system, therefore, regulates the time of non-braking of the rear wheel so that the actual speed of the vehicle appears at A in the form of discrete values. When the wheel is not locked, the time $t'_1$ would be infinite, which is why a monostable (not shown) whose period is greater than any of the possible times $t'_1$ is substituted for the evaluation of $t'_1$ and restores braking.

Figure 4:
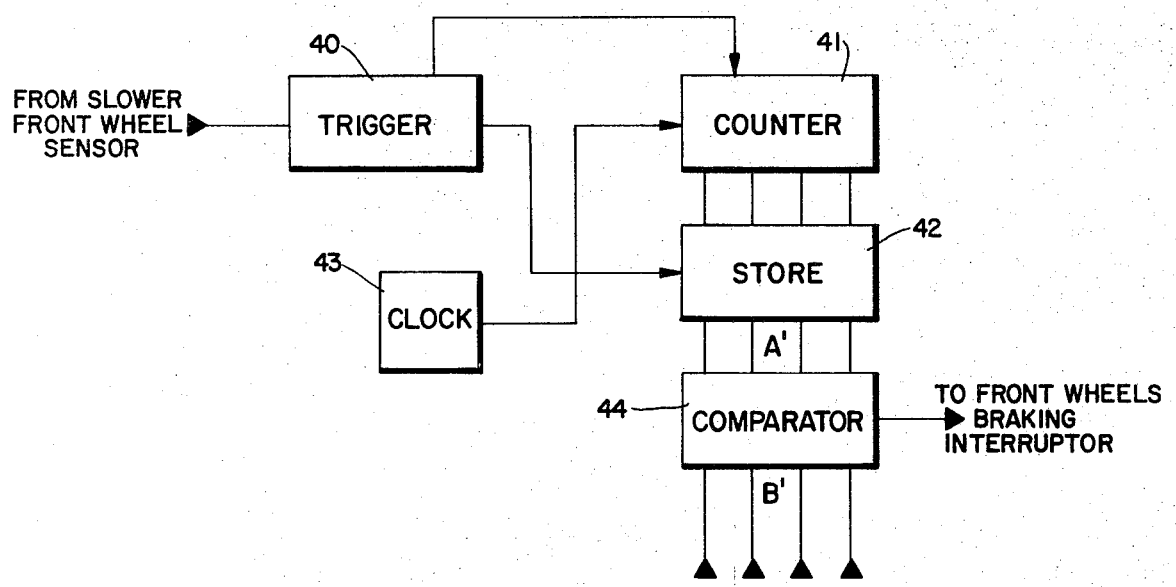
FIG. 4 is a block diagram illustrating electronic circuitry for controlling the braking of a front wheel by the slip.

FIG. 4 illustrates an embodiment of an electronic system controlling the braking of a front wheel according to the slip. The signal from the front wheel sensor, shaped in 40, generates a zero resetting signal for a counter 41 and a gating signal for a register 42. A clock 43 is connected to the input of the counter 41 and register 42 feeds a speed measurement at each period to the input $a'$ of a comparator 44. The input $B'$ of comparator 44 receives the value for the actual vehicle speed, sampled as described above. Judicious selection of the frequency of the clock 43 relative to that of clock 16 enables this front wheel to be controlled by the slip according to whether the output $A' > B'$ of 44 is at the level 1 or 0.

Figure 5:
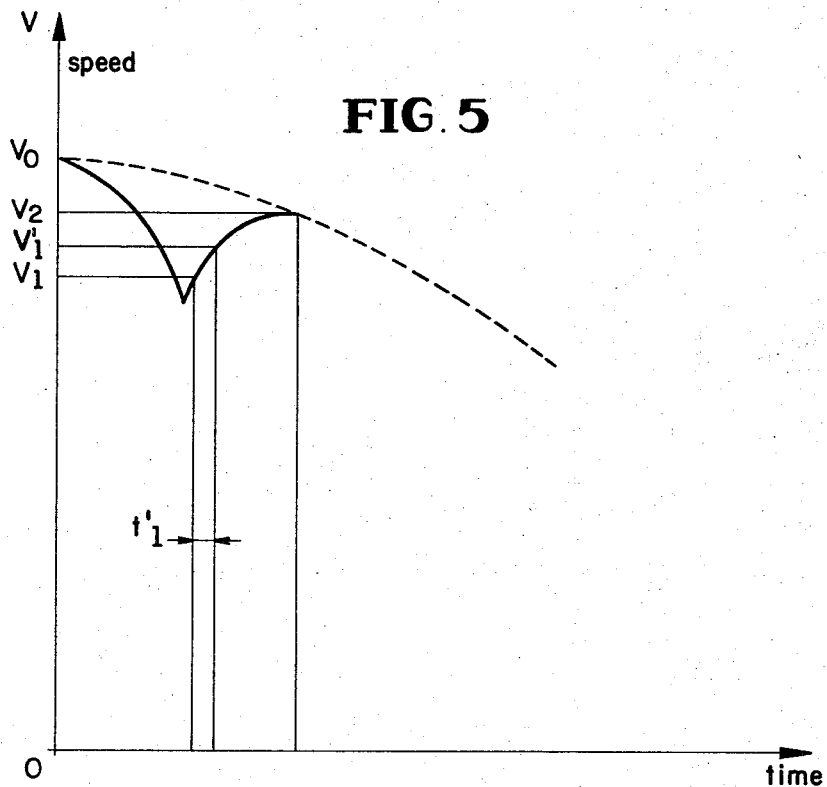
FIG. 5 is a graph plotting the variation with time of the vehicle speed and rear wheel speed in the course of an operating cycle of the system.

FIG. 5 is a graph illustrating the variation in the speeds during a cycle. The time origin being set at the beginning of braking, the variation in the vehicle speed is represented by a broken line and the speed of the rear wheel by a solid line. At the beginning of the cycle the wheel speed, equal to the vehicle speed, is stored. As a result of braking the wheel speed decreases very rapidly. When it drops to a certain fraction $V_1$ of $V_0$, braking is interrupted. The wheel speed drops a little further due to the inertia of the system and then increases. To calculate the time elapsing before the wheel speed again equals the vehicle speed, the time $t'_1$ from the instant at which the speed again equals $V_1$ to the instant at which it equals a certain predetermined fraction $V'_1$ of $V^0$ is measured.

Theoretical calculations show that the time required for the wheel to restart under any adhesion and vehicle speed conditions can be assessed merely by multiplying this time $t'_1$ by a certain constant coefficient. The calculator therefore supplies this time $t'_2 = C \times t'_1$, and equality of the vehicle and rear wheels speeds is then assured. The cycle can now be repeated.

The invention can therefore provide a highly effective anti-lock device, using only simple sensors and digital computing circuits of a thoroughly conventional type.

Obviously, the embodiment described above is given by way of example only and may be modified as desired without exceeding the scope of the invention.

I claim:

1. A method of controlling the slip ratio of vehicle wheels during braking, characterized in the succession of the steps of storing the speed of the rear wheels upon the initiation of braking, at the end of a certain period of time after the beginning of a cycle releasing the rear wheels brake and monitoring speed of said rear wheels; determining the time after which the rear wheels no longer tend to slip relative to the ground; at this precise instant, substituting in a store the value of the speed of the faster rear wheel for replacing the corresponding value stored during the preceeding cycle or the initial value for the first cycle, and simultaneously restoring the rear wheel braking, these both actions ending a cycle and beginning a new one; meanwhile measuring permanently during each cycle the front wheel speed, calculating the difference between the actual stored speed and the measured front wheel speed, interrupting the front wheel braking each time that said difference exceeds a certain fraction of said stored speed and restoring said braking each time that said difference is lower than said fraction.

2. A method of controlling the slip ratio of vehicle wheels according to claim 1, characterized in that said period of time is determined by the instant of the cycle when the speed of the faster rear wheel decreases to a first determined fraction of said stored speed, and that from this instant said time after which the rear wheels no longer tend to slip is determined by measuring the time elapsed between the instant when the speed of the faster rear wheel increases to a second determined fraction of said stored speed and the instant when the speed of the faster rear wheel increases to a third determined fraction of said stored speed, and then multiplying said measured time by a constant factor.

3. An anti-lock brake control device comprising an impulse sensor associated with each of said vehicle wheels; a first trigger for reshaping the impulses sent by said sensor associated with the faster rear wheel; a first clock furnishing an uninterrupted succession of impulses; a first digit counter adding said impulses of said first clock; a first store for storing the contents of said first counter when receiving an impulse from said trigger and through a first gate, said counter having a zero resetting input directly connected to output of said trigger; a second digit counter adding alternately the impulses of a second clock and of a third clock through a commutator actuated by a direct output and a complementary output of a first bistable of the flip-flop type responsive to trailing edges; a second store for storing the contents of said second counter when receiving a trigger impulse, said counter having a zero resetting input connected to said trigger output; a bit to bit comparator comparing the contents of first and second stores and taking, each time that the first store contents is lower than the second store contents, an active state, in which state said comparator delivers a long impulse to said first bistable, which changes over only when this impulse stops, and to an input of a second gate another input of which is connected to said direct output of first bistable and the output of which is connected to a second flip-flop bistable responsive to leading edges; an up and down counter, the up input of which collects impulses from a fourth clock through a third gate actuated by said complementary output of first bistable, and the down input of which collects impulses from a fifth clock through a fourth gate actuated by the output of a third bistable of the set-reset type, the set input of which is connected to said complementary output of first bistable and the output of which is activated by back return to zero, said output being connected through an inverter to reset inputs of second and third set-reset bistables and to set input of a fourth set-reset bistable, the reset input of which is connected to said trigger output and the output of which opens said first gate only when the vehicle brake command is actuated; first electromagnetic means actuated by output of said second bistable for interrupting the braking of the rear wheels; a second trigger for reshaping the impulses from said sensor associated with the slower front wheel; a third counter adding the impulses of a sixth clock; a third store for storing the contents of said third counter when receiving an impulse from said second trigger, said counter having a zero resetting input connected to the output of said second trigger; a second bit to bit comparator comparing the contents of said third store with the contents of said first store for generating a signal each time that the contents of third store is lower than the contents of first store; and second electromagnetic means actuated by said signal for interrupting the braking of the front wheels for the whole duration of said signal.

* * * * *